(12) United States Patent
Asano et al.

(10) Patent No.: US 9,567,443 B2
(45) Date of Patent: Feb. 14, 2017

(54) METHOD OF PRODUCING POLYCARBONATE-BASED POLYMER MICROPARTICLES COMPRISING CONTACTING AN EMULSION WITH A POOR SOLVENT, AND POLYCARBONATE-BASED POLYMER MICROPARTICLES

(71) Applicant: Toray Industries, Inc., Tokyo (JP)

(72) Inventors: Itaru Asano, Nagoya (JP); Hiroshi Takezaki, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/375,262

(22) PCT Filed: Jan. 18, 2013

(86) PCT No.: PCT/JP2013/050989
§ 371 (c)(1),
(2) Date: Jul. 29, 2014

(87) PCT Pub. No.: WO2013/114982
PCT Pub. Date: Aug. 8, 2013

(65) Prior Publication Data
US 2015/0024205 A1 Jan. 22, 2015

(30) Foreign Application Priority Data
Jan. 30, 2012 (JP) ................................ 2012-016846

(51) Int. Cl.
*C08G 64/02* (2006.01)
*C08J 3/14* (2006.01)
(Continued)

(52) U.S. Cl.
CPC .................. *C08J 3/14* (2013.01); *C08G 64/00* (2013.01); *C08G 64/02* (2013.01); *C08G 64/04* (2013.01);
(Continued)

(58) Field of Classification Search
CPC .......... C08G 64/02; C08G 64/04; C08G 64/16
(Continued)

(56) References Cited

U.S. PATENT DOCUMENTS 4,166,800 A * 9/1979 Fong ...................... A01N 25/28
264/4.4
4,975,525 A 12/1990 Hostetler et al.
(Continued)

FOREIGN PATENT DOCUMENTS

JP 61-174229 A 8/1986
JP 63-243140 A 10/1988
(Continued)

OTHER PUBLICATIONS

Supplementary European Search Report dated Sep. 1, 2015 of corresponding European Application No. 13744402.2.

*Primary Examiner* — Holly Le
(74) *Attorney, Agent, or Firm* — DLA Piper LLP (US)

(57) ABSTRACT

A method of producing polycarbonate-based polymer microparticles including forming an emulsion in a system in which a polycarbonate-based polymer (A), a polymer (B) different from the polycarbonate-based polymer (A) and an organic solvent (C) are dissolved and mixed together and which causes phase separation into two phases of a solution phase having the polycarbonate-based polymer (A) as its main component and a solution phase having the polymer (B) different from the polycarbonate-based polymer (a) as its main component, and contacting a poor solvent for the polycarbonate-based polymer (A) with the emulsion at a
(Continued)

temperature of 80° C. or higher to thereby precipitate microparticles of the polycarbonate-based polymer (A).

13 Claims, 2 Drawing Sheets

(51) Int. Cl.
- *C08G 64/16* (2006.01)
- *C08G 64/04* (2006.01)
- *C08G 64/00* (2006.01)
- *C08G 64/40* (2006.01)

(52) U.S. Cl.
CPC ............. *C08G 64/16* (2013.01); *C08G 64/403* (2013.01); *C08G 64/406* (2013.01); *C08J 2369/00* (2013.01); *Y10T 428/2982* (2015.01)

(58) Field of Classification Search
USPC .......................................... 525/462; 428/402
See application file for complete search history.

(56) References Cited

U.S. PATENT DOCUMENTS

| | | | |
|---|---|---|---|
| 8,574,669 B2 * | 11/2013 | Asano et al. | ................. 427/212 |
| 9,017,812 B2 * | 4/2015 | Takezaki et al. | ............. 428/402 |
| 2009/0280423 A1 * | 11/2009 | Yahiro | ................... C08G 18/10 |
| | | | 430/108.4 |
| 2011/0070442 A1 * | 3/2011 | Asano et al. | ................. 428/402 |
| 2011/0245451 A1 * | 10/2011 | Kim | ..................... C08G 64/307 |
| | | | 528/196 |
| 2013/0337263 A1 * | 12/2013 | Asano et al. | ................. 428/402 |

FOREIGN PATENT DOCUMENTS

| | | |
|---|---|---|
| JP | 06-228299 A | 8/1994 |
| JP | 2001-213970 A | 8/2001 |
| JP | 2005-220035 A | 8/2005 |
| JP | 2007-233329 | 9/2007 |
| JP | 2010-008757 A | 1/2010 |
| JP | 2011-026471 A | 2/2011 |
| WO | 2009/142231 A1 | 11/2009 |

* cited by examiner

METHOD OF PRODUCING POLYCARBONATE-BASED POLYMER MICROPARTICLES COMPRISING CONTACTING AN EMULSION WITH A POOR SOLVENT, AND POLYCARBONATE-BASED POLYMER MICROPARTICLES

TECHNICAL FIELD

This disclosure relates to a method of producing polycarbonate-based polymer microparticles, and polycarbonate-based polymer microparticles.

BACKGROUND

Differently from polymer molded products such as films, fibers, injection molded products and extrusion molded products, polymer microparticles are used for modification and improvement of various materials by utilizing their large specific surface area and their spherical shape. Their major uses include modifiers for cosmetics, additives for toners, additives for paints, additives for molded products and light diffusing agents for films (JP-A-2010-8757 and JP-A-2005-220035).

Typical examples of such versatile polymer microparticles include acrylic polymer particles and polystyrene polymer particles which can be produced by a generally known method such as emulsification polymerization and suspension polymerization, and which are used for the above-described various applications.

On the other hand, polycarbonates are known as a polymer having high heat resistance, high refraction index and high weather resistance compared to acrylic polymers and poly-styrenes, and are used for a wide variety of applications in resin moldings. However, there are only few publications that disclose how to form polycarbonate into a microparticle shape, and the major method to obtain powder-like products was the crushing method (JP-A-2011-26471).

On the other hand, as a known method of producing polymer microparticles, a method using emulsion is disclosed in WO 2009/142231 A1. However, although attempts to produce polycarbonate-based polymer microparticles were being made, the obtained particles had an uneven surface and did not have acceptable properties such as particle flowability which is required for cosmetics and the like (WO '231).

Further, a method is disclosed in which polycarbonate is melted in silicone oil, mixed by homogenizer, and thereafter cooled to produce polycarbonate particles. However, the polycarbonate particles obtained by that method contain not only a small proportion of spherical smooth-surface microparticles but also a huge proportion of fiber-like polycarbonates, and it was difficult to isolate microparticles from them. In other words, it was not possible to obtain polycarbonate-based polymer microparticles having acceptable properties such as flowability by using that method (JP-A-2001-213970).

It could therefore be helpful to provide a method of producing polycarbonate-based polymer microparticles, particularly real spherical polycarbonate-based polymer microparticles having a smooth particle surface and being suitable for cosmetics, films having a function of diffusing light and the like.

SUMMARY

We thus provide:

[1] A method of producing polycarbonate-based polymer microparticles wherein, an emulsion is formed in a system in which a polycarbonate-based polymer (A), a polymer (B) different from said polycarbonate-based polymer (A) and an organic solvent (C) are dissolved and mixed together and which causes phase separation into two phases of a solution phase having said polycarbonate-based polymer (A) as its main component and a solution phase having said polymer (B) different from said polycarbonate-based polymer (A) as its main component, and thereafter, a poor solvent for said polycarbonate-based polymer (A) is brought into contact with the emulsion at a temperature of 80° C. or higher, thereby precipitating microparticles of said polycarbonate-based polymer (A).

[2] The method of producing polycarbonate-based polymer microparticles according to [1], wherein a contact temperature of the poor solvent for said polycarbonate-based polymer (A) with the emulsion is 90° C. or higher.

[3] The method of producing polycarbonate-based polymer microparticles according to [1] or [2], wherein the poor solvent for polycarbonate-based polymer (A) is brought into contact with the emulsion at a ratio of 1 to 10 parts by mass to a total amount of the emulsion of 1 part by mass.

[4] The method of producing polycarbonate-based polymer microparticles according to any one of [1] to [3], wherein the poor solvent for said polycarbonate-based polymer (A) is any of water, methanol and ethanol.

[5] The method of producing polycarbonate-based polymer microparticles according to any one of [1] to [4], wherein said polymer (B) is any of polyvinyl alcohol, hydroxypropyl cellulose, polyethylene oxide and polyethylene glycol.

[6] The method of producing polycarbonate-based polymer microparticles according to any one of [1] to [5], wherein said organic solvent (C) is an aprotic polar solvent.

[7] The method of producing polycarbonate-based polymer microparticles according to [6], wherein the aprotic polar solvent is any of N-methyl-2-pyrrolidone, dimethyl sulfoxide, N,N-dimethyl formamide, N,N-dimethyl acetamide and propylene carbonate.

[8] Polycarbonate-based polymer microparticles having an average sphericity of 80 or higher.

[9] Polycarbonate-based polymer microparticles according to [8], wherein microparticles of a polycarbonate-based polymer (A) having a sphericity of 80 or higher are contained at a content of 60% or more.

[10] Polycarbonate-based polymer microparticles according to [8] or [9], wherein an average particle diameter of the microparticles is 0.1 to 100 µm.

[11] Polycarbonate-based polymer microparticles according to any of [8] to [10], wherein a particle diameter distribution index of the microparticles is 1 to 3.

According to our methods of producing polycarbonate-based polymer microparticles, it is possible to produce real spherical polycarbonate-based polymer microparticles having a smooth surface easily and efficiently. The obtained real spherical polycarbonate-based polymer microparticles are smooth-surfaced particles having a good slipperiness and, in addition, are high-functionality microparticles having features of polycarbonates such as high heat resistance, high refractive index and high weather resistance, thus being suitable for use in the following applications: cosmetic materials and additives (such as cosmetic foundations, lipsticks, and scrubbing agents for men's cosmetics), slush-moldable material, rapid prototyping/rapid manufacturing material, paste resin for plastic sol, powder blocking agent, additive for paints, slipperiness improving agent for plastic films/sheets, antiblocking agent, gloss adjusting agent, frosted finish agent, light diffusion agent, surface hardness improving agent, various modifying agents such as ductility improving material, spacer for liquid crystal display equipment, filler for chromatography, medical materials for drug delivery system/diagnostic reagents, support agent for perfume/pesticide, catalyst/carrier for chemical reactions, gas adsorption agent, sintered material for ceramic processing, standard particle material for measurement/analysis, particle material for food manufacture industry, material for powder coating, toner for electrophotographic development, core particle of conductive particle, and particle for pore forming material for metals.

DETAILED DESCRIPTION

Figure 1:
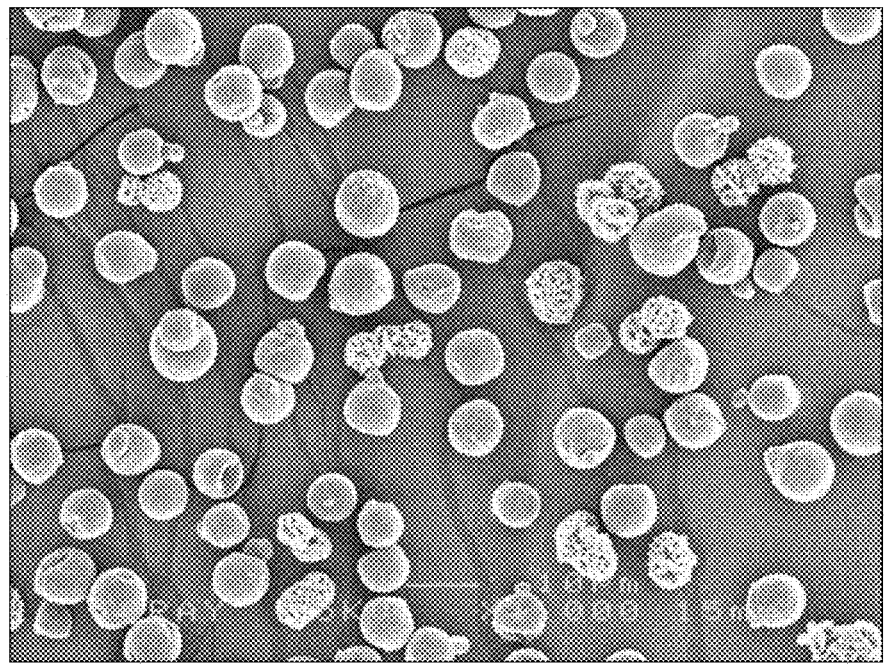
FIG. 1 is an observation diagram where the polycarbonate-based polymer microparticles produced in Example 1 are observed by a scanning electron microscope.

Hereinafter, our methods and microparticles will be explained in detail.

The smooth-surfaced real spherical polycarbonate-based polymer microparticles may be produced by forming an emulsion in a system in which a polycarbonate-based polymer (A), a polymer (B) different from the polycarbonate-based polymer (A) and an organic solvent (C) are dissolved and mixed together and which causes phase separation into two phases of a solution phase having the polycarbonate-based polymer (A) as its main component and a solution phase having the polymer (B) different from the polycarbonate-based polymer (A) as its main component, then bringing a poor solvent for the polycarbonate-based polymer (A) into contact with the emulsion at a temperature of 80° C. or higher, thereby precipitating microparticles of the polycarbonate-based polymer (A).

The polycarbonate-based polymer (A) is a polymer containing carbonate group and can be an aliphatic polycarbonate, an aromatic polycarbonate and the like, for example such as those having a structure represented by the following chemical formula:

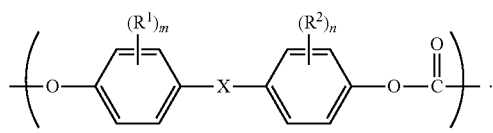

In the chemical formula, each $R^1$ and $R^2$ individually represents hydrogen, an alkyl group with a carbon number of 1 to 6, a cycloalkyl group with a carbon number of 5 to 7, an aryl group with a carbon number of 6 to 12, or a halogen group; each m and n individually represents an integer of 0 to 4; and X is a repeat unit having a structure represented by direct bond, oxygen, sulfur, SO, $SO_2$, $CR^3R^4$ (where, each $R^3$ and $R^4$ individually represents hydrogen, an alkyl group with a carbon number of 1 to 6 or an aryl group with a carbon number of 6 to 12, and can be either the same or different from each other), a cycloalkylidene group with a carbon number of 5 to 11, an alkylene group with a carbon number of 2 to 10, a polydimethyl siloxane group, or trifluoromethyl group.

Representative examples of the substituents $R^1$ and $R^2$ include the following: the above-described alkyl groups such as methyl group, ethyl group, n-propyl group, isopropyl group, n-butyl group, sec-butyl group, tert-butyl group, isobutyl group, n-pentyl group, isopentyl group, sec-pentyl group, tert-pentyl group, neopentyl group, n-hexyl group, isohexyl group, sec-hexyl group, tert-hexyl group, neohexyl group and cyclopentyl methyl group; the above-described cycloalkyl groups such as cyclopentyl group, cyclohexyl group, methyl cyclopentyl group, cycloheptyl group, methyl cyclohexyl group, dimethyl cyclopentyl group and ethyl cyclopentyl group; the above-described aryl groups such as phenyl group, methyl phenyl group, ethyl phenyl group, propyl phenyl group, butyl phenyl group, dimethyl phenyl group, trimethyl phenyl group, cyclohexyl phenyl group, 4-biphenyl group, 3-biphenyl group, 1-naphthyl group, 2-naphthyl group, methyl naphthyl group, dimethyl naphthyl group and ethyl naphthyl group; and the above-described halogen groups such as fluorine atom, chlorine atom, bromine atom and iodine atom.

Representative examples of $R^3$ and $R^4$ in $CR^3R^4$ of X include the following: hydrogen atom; the above-described alkyl groups such as methyl group, ethyl group, n-propyl group, isopropyl group, n-butyl group, sec-butyl group, tert-butyl group, isobutyl group, n-pentyl group, isopentyl group, sec-pentyl group, tert-pentyl group, neopentyl group, n-hexyl group, isohexyl group, sec-hexyl group, tert-hexyl group, neohexyl group and cyclopentyl methyl group; the above-described cycloalkyl groups such as cyclopentyl group, cyclohexyl group, methyl cyclopentyl group, cycloheptyl group, methyl cyclohexyl group, dimethyl cyclopentyl group and ethyl cyclopentyl group; and the above-described aryl groups such as phenyl group, methyl phenyl group, ethyl phenyl group, propyl phenyl group, butyl phenyl group, dimethyl phenyl group, trimethyl phenyl group, cyclohexyl phenyl group, 4-biphenyl group, 3-biphenyl group, 1-naphthyl group, 2-naphthyl group, methyl naphthyl group, dimethyl naphthyl group and ethyl naphthyl group.

From the viewpoint of availability and cost, each $R^1$ and $R^2$ is preferably hydrogen atom. With respect to X, each $R^3$ and $R^4$ in $CR^3R^4$ is preferably methyl group or hydrogen atom, and most preferably methyl group.

The molecular weight and molecular weight distribution of the polycarbonate-based polymer (A) are not particularly limited as long as the polymer can be dissolved in the organic solvent (C) substantially. However, from the viewpoint of ease of maintaining particle structure and improvement of hydrolysis resistance, the weight average molecular weight is preferably 10,000 or more, more preferably 15,000 or more, further preferably 20,000 or more, particularly preferably 50,000 or more, and most preferably 100,000 or more. The upper limit is 1,000,000 or less, although not particularly limited thereto. The weight average molecular weight referred to herein is a weight average molecular weight value measured by gel permeation chromatography (GPC) using tetrahydrofuran as solvent and converted in terms of polystyrene (PS).

Such a polycarbonate-based polymer can be produced by known methods such as interfacial polymerization, melt ester exchange method, solid phase ester exchange method, and ring opening polymerization of cyclic carbonate compounds. Representative raw materials for polycarbonates used in the known methods include divalent phenols in combination with any of phosgene and diphenyl carbonate.

Representative examples of the divalent phenols include the following: bis(4-hydroxyphenyl) methane, 1,1-bis(4-hydroxyphenyl) ethane, 1,2-bis(4-hydroxyphenyl) ethane, 2,2-bis(4-hydroxyphenyl) propane, 2,2-bis(3-methyl-4-hydroxyphenyl) butane, 2,2-bis(4-hydroxyphenyl) butane, 2,2-bis(4-hydroxyphenyl) octane, 4,4-bis(4-hydroxyphenyl) heptane, 1,1-bis(4-hydroxyphenyl)-1,1-diphenylmethane, 1,1-bis(4-hydroxyphenyl)-1-phenylethane, 1,1-bis(4-hydroxyphenyl)-1-phenylmethane, bis(4-hydroxyphenyl) ether, bis(4-hydroxyphenyl) sulfide, bis(4-hydroxyphenyl) sulfone, 1,1-bis(4-hydroxyphenyl) cyclopentane, 1,1-bis(4-hydroxyphenyl) cyclohexane, 2,2-bis(3-methyl-4-hydroxyphenyl) propane, 2,2-bis(3-phenyl-4-hydroxyphenyl) propane, 2-(3-methyl-4-hydroxyphenyl)-2-(4-hydroxyphenyl)-1-phenylethane, bis(3-methyl-4-hydroxyphenyl) sulfide, bis(3-methyl-4-hydroxyphenyl) sulfone, bis(3-methyl-4-hydroxyphenyl) methane, 1,1-bis(3-methyl-4-hydroxyphenyl) cyclohexane, 4,4'-dihydroxybiphenyl, 2,2-bis(2-methyl-4-hydroxyphenyl) propane, 1,1-bis(2-butyl-4-hydroxy-5-methylphenyl) butane, 1,1-bis(2-tert-butyl-4-hydroxy-3-methylphenyl) ethane, 1,1-bis(2-tert-butyl-4-hydroxy-5-methylphenyl) propane, 1,1-bis(2-tert-butyl-4-hydroxy-5-methylphenyl) butane, 1,1-bis(2-tert-butyl-4-hydroxy-5-methylphenyl) isobutane, 1,1-bis(2-tert-butyl-4-hydroxy-5-methylphenyl) heptane, 1,1-bis(2-tert-butyl-4-hydroxy-5-methylphenyl)-1-phenylmethane, 1,1-bis(2-tert-amyl-4-hydroxy-5-methylphenyl) butane, bis(3-chloro-4-hydroxyphenyl) methane, bis(3,5-dibromo-4-hydroxyphenyl) methane, 2,2-bis(3-chloro-4-hydroxyphenyl) propane, 2,2-bis(3-fluoro-4-hydroxyphenyl) propane, 2,2-bis(3-bromo-4-hydroxyphenyl) propane, 2,2-bis(3,5-difluoro-4-hydroxyphenyl) propane, 2,2-bis(3,5-dichloro-4-hydroxyphenyl) propane, 2,2-bis(3,5-dibromo-4-hydroxyphenyl) propane, 2,2-bis(3-bromo-4-hydroxy-5-chlorophenyl) propane, 2,2-bis(3,5-dichloro-4-hydroxyphenyl) butane, 2,2-bis(3,5-dibromo-4-hydroxyphenyl) butane, 1-phenyl-1,1-bis(3-fluoro-4-hydroxyphenyl) ethane, bis(3-fluoro-4-hydroxyphenyl) ether, 3,3'-difluoro-4,4'-dihydroxybiphenyl, 1,1-bis(3-cyclohexyl-4-hydroxyphenyl) cyclohexane, bis(4-hydroxyphenyl) sulfoxide, 2,2-bis(4-hydroxyphenyl) hexafluoropropane, 1,1-bis(3-phenyl-4-hydroxyphenyl) cyclohexane, bis(3-phenyl-4-hydroxyphenyl) sulfone, 4,4'-(3,3,5-trimethylcyclohexylidene) diphenol, and both phenol-terminated polydimethylsiloxane. These divalent phenols can be used singly or in combination. Further, other ingredients can be co-polymerized as long as their amount is within the bounds of not harming the microparticles.

The polymer (B) different from the polycarbonate-based polymer (A) can be a thermoplastic or thermosetting resin selected from polymers (B) different from the polycarbonate-based polymer (A). However, from the viewpoint of solubility in the organic solvent (C), a thermoplastic resin is preferred.

Representative examples of the thermoplastic resin include the following: synthetic resins such as poly(vinyl alcohol) (including completely or partially saponified poly(vinyl alcohol)), poly(vinylalcohol-ethylene) copolymer (including completely or partially saponified poly(vinylalcohol-ethylene) copolymer), polyvinylpyrrolidone, poly(ethylene glycol), poly(ethylene oxide), sucrose fatty acid ester, poly(oxyethylene fatty acid ester), poly(oxyethylene lauric fatty acid ester), poly(oxyethylene glycol mono fatty acid ester), poly(oxyethylene alkyl phenyl ether), poly(oxyalkyl ether), polyacrylic acid, sodium polyacrylate, polymethacrylic acid, sodium polymethacrylate, polystyrene sulfonic acid, polystyrene sulfonic acid sodium salt, polyvinyl pyrrolidinium chloride, poly(styrene-maleic acid) copolymer, amino poly(acrylamide), poly(para vinyl phenol), polyallylamine, polyvinyl ether, poly(vinyl formal), poly(acrylamide), poly(methacryl amide), poly(oxyethylene amine), poly(vinyl pyrrolidone), poly(vinyl pyridine), polyaminosulfone, and polyethyleneimine; disaccharides such as maltose, cellobiose, lactose, and sucrose; cellulose derivatives such as cellulose, chitosan, hydroxyethyl cellulose, hydroxypropyl cellulose, methyl cellulose, ethyl cellulose, ethyl hydroxy cellulose, carboxymethyl ethyl cellulose, carboxymethyl cellulose, sodium carboxymethyl cellulose, and cellulose ester; amyloses and their derivatives; starches and their derivatives; polysaccharides and their derivatives such as dextrin, cyclodextrin, sodium alginate and their derivatives; gelatins; caseins; collagens; albumins; fibroins; keratins; fibrins; carrageenans; chondroitin sulfates; gums arabic; agars; and proteins. From the viewpoint of achieving a narrow particle diameter distribution, preferred are poly(vinyl alcohol) (including completely or partially saponified poly(vinyl alcohol)), poly(vinylalcohol-ethylene) copolymer (including completely or partially saponified poly(vinylalcohol-ethylene) copolymer), poly(ethylene glycol), poly(ethylene oxide), sucrose fatty acid ester, poly(oxyethylene alkyl phenyl ether), poly(oxyalkyl ether), polyacrylic acid, polymethacrylic acid, cellulose derivatives such as carboxymethyl cellulose, hydroxyethyl cellulose, hydroxypropyl cellulose, methyl cellulose, ethyl cellulose, ethyl hydroxy cellulose, carboxymethyl ethyl cellulose, carboxymethyl cellulose, sodium carboxymethyl cellulose and cellulose ester, and polyvinylpyrrolidone; more preferred are poly(vinyl alcohol) (including completely or partially saponified poly(vinyl alcohol)), poly(vinylalcohol-ethylene) copolymer (including completely or partially saponified poly(vinylalcohol-ethylene) copolymer), poly(ethylene glycol), poly(ethylene oxide), cellulose derivatives such as carboxymethyl cellulose, hydroxyethyl cellulose, hydroxypropyl cellulose, methyl cellulose, ethyl cellulose, ethyl hydroxy cellulose, carboxymethyl ethyl cellulose, carboxymethyl cellulose, sodium carboxymethyl cellulose and cellulose ester, and polyvinylpyrrolidone; and particularly preferred are poly(vinyl alcohol) (including completely or partially saponified poly(vinyl alcohol)), poly(ethylene glycol), poly(ethylene oxide), and hydroxypropyl cellulose.

The molecular weight of the polymer (B) different from the polycarbonate-based polymer (A) is preferably 1,000 to 100,000,000 in terms of weight average molecular weight, more preferably 1,000 to 10,000,000, further preferably 5,000 to 1,000,000, particularly preferably 10,000 to 500,000, and most preferably 10,000 to 100,000.

The weight average molecular weight referred to herein is a weight average molecular weight measured by gel permeation chromatography (GPC) using water as solvent and converted in terms of polyethylene glycol.

Dimethyl formamide is used if water does not serve for the measurement, and tetrahydrofuran is used if measurement is still impossible. If it is still further impossible to make measurements, then hexafluoroisopropanol is used.

The organic solvent (C) is a solvent in which the polycarbonate-based polymer (A) and the polymer (B) different from the polycarbonate-based polymer (A) are dissolved.

Representative examples of the organic solvent (C) include the following: ester-based solvents such as ethyl acetate and methyl acetate; halogenated hydrocarbon solvents such as chloroform, bromoform, methylene chloride, 1,2-dichloroethane, 1,1,1-trichloroethane, chlorobenzene and 2,6-dichlorotoluene; ketone solvents such as acetone, methyl ethyl ketone, methyl isobutyl ketone and methyl butyl ketone; aprotic polar solvents such as N-methyl-2-pyrrolidone, dimethyl sulfoxide, N,N-dimethyl formamide, N,N-dimethyl acetamide, propylene carbonate, trimethyl phosphate, 1,3-dimethyl-2-imidazolidinone, sulfolane and acetonitrile; carboxylic acid solvents such as formic acid, acetic acid, propionic acid, butyric acid and lactic acid; ether solvents such as anisole, diethyl ether, tetrahydrofuran, diisopropyl ether, dioxane, diethylene glycol dimethyl ether and dimethoxy ethane; and mixtures thereof. Preferred are aromatic hydrocarbon solvents, aliphatic hydrocarbon solvents, halogenated hydrocarbon solvents, alcohol solvents, ether solvents, aprotic polar solvents and carboxylic acid solvents, more preferred are water-soluble solvents such as alcohol solvents, aprotic polar solvents and carboxylic acid solvents, and particularly preferred are aprotic polar solvents. With respect to the aprotic polar solvents, due to their ease of handling, preferred are N-methyl-2-pyrrolidone, dimethyl sulfoxide, N,N-dimethyl formamide, N,N-dimethyl acetamide and propylene carbonate, particularly preferred are N-methyl-2-pyrrolidone and dimethyl sulfoxide, and most preferred is N-methyl-2-pyrrolidone. These solvents can be used singly or in combination.

The "system in which a polycarbonate-based polymer (A), a polymer (B) different from said polycarbonate-based polymer (A) and an organic solvent (C) are dissolved and mixed together and which causes phase separation into two phases of a solution phase having said polycarbonate-based polymer (A) as its main component and a solution phase having said polymer (B) different from said polycarbonate-based polymer (A) as its main component" is a system which causes phase separation into two phases of a solution phase having the polycarbonate-based polymer (A) as its main component and a solution phase having the polymer (B) different from the polycarbonate-based polymer (A) as its main component when the polycarbonate-based polymer (A), the polymer (B) different from the polycarbonate-based polymer (A) and the organic solvent (C) are dissolved and mixed together.

Using such a system which causes phase separation makes it possible to form an emulsion by carrying out mixing under phase separation conditions and thus causing emulsification.

In the above-described system, the possibility of dissolution of the polymer is confirmed by determining whether the polymer dissolves in the organic solvent (C) up to more than 1 mass % at a temperature at which the methods are carried out, that is, at a temperature at which the polycarbonate-based polymer (A) and the polymer (B) different from the polycarbonate-based polymer (A) are dissolved and mixed to form two separate phases.

In this emulsion, the solution phase of the polycarbonate-based polymer (A) acts as dispersed phase and the solution phase of the polymer (B) different from the polycarbonate-based polymer (A) acts as a continuous phase. By bringing a poor solvent for the polycarbonate-based polymer (A) into contact with this emulsion, the polycarbonate-based polymer (A) is precipitated from the solution phase of the polycarbonate-based polymer (A) in the emulsion, thereby obtaining polymer microparticles composed of the polycarbonate-based polymer (A).

The poor solvent for the polycarbonate-based polymer (A) is a solvent in which the polycarbonate-based polymer (A) is not dissolved. The expression "the polycarbonate-based polymer (A) is not dissolved" here means that the solubility of the polycarbonate-based polymer (A) in the poor solvent is 1 mass % or less, preferably 0.5 mass % or less, and more preferably 0.1 mass % or less.

The production process uses a poor solvent for the polycarbonate-based polymer (A), and this solvent is preferably a solvent which is a poor solvent for the polycarbonate-based polymer (A) and at the same time a solvent which dissolves the polymer (B) different from the polycarbonate-based polymer (A). By this, polymer microparticles composed of the polycarbonate-based polymer (A) can be precipitated efficiently. Further, it is preferred that the solvent for dissolving the polymers of the polycarbonate-based polymer (A) and the polymer (B) different from the polycarbonate-based polymer (A) can mix homogeneously with the poor solvent for the polycarbonate-based polymer (A).

Although the poor solvent may vary depending upon the type of the polycarbonate-based polymer (A) and desirably upon the types of both the polycarbonate-based polymer (A) and the polymer (B) different from the polycarbonate-based polymer (A), representative examples of the poor solvent include one or more solvents selected from the following: aliphatic hydrocarbon solvents such as pentane, hexane, heptane, octane, nonane, n-decane, n-dodecane, n-tridecane, cyclohexane and cyclopentane; aromatic hydrocarbon solvents such as benzene, toluene and xylene; alcohol solvents such as methanol, ethanol, 1-propanol and 2-propanol; and water.

From the viewpoint of efficiently making the polycarbonate-based polymer (A) into particles, preferred are aromatic hydrocarbon solvents, aliphatic hydrocarbon solvents, alcohol solvents and water, more preferred are alcohol solvents and water, and most preferred is water.

It is possible to efficiently precipitate the polycarbonate-based polymer (A) and obtain polymer microparticles by appropriately selecting and combining the polycarbonate-based polymer (A), the polymer (B) different from the polycarbonate-based polymer (A), the organic solvent (C) to dissolve them, and a poor solvent for the polycarbonate-based polymer (A).

The mixed liquid dissolved with the polycarbonate-based polymer (A), the polymer (B) different from the polycarbonate-based polymer (A) and the organic solvent (C) to dissolve them must cause phase separation into two phases of a solution phase mainly composed of the polycarbonate-based polymer (A) and a solution phase mainly composed of the polymer (B) different from the polycarbonate-based polymer (A). In this step, the organic solvent (C) in the solution phase mainly composed of the polycarbonate-based polymer (A) and the organic solvent (C) in the solution phase mainly composed of the polymer (B) different from the polycarbonate-based polymer (A) may be identical with or different from each other, but it is preferred that these solvents are substantially the same.

The conditions for formation of the two separate phase state vary depending upon the types of the polycarbonate-based polymer (A) and the polymer (B) different from the polycarbonate-based polymer (A), the molecular weights of the polycarbonate-based polymer (A) and the polymer (B)

different from the polycarbonate-based polymer (A), the type of the organic solvent (C), the concentrations of the polycarbonate-based polymer (A) and the polymer (B) different from the polycarbonate-based polymer (A), and the temperature and pressure at which the method is to be carried out.

To obtain conditions where phase separation easily takes place, it is preferred that the solubility parameter (hereinafter, also referred to as SP value) of the polycarbonate-based polymer (A) and that of the polymer (B) different from the polycarbonate-based polymer (A) are largely different from each other.

The difference between both SP values is preferably 1 $(J/cm^3)^{1/2}$ or greater, more preferably 2 $(J/cm^3)^{1/2}$ or greater, further preferably 3 $(J/cm^3)^{1/2}$ or greater, particularly preferably 5 $(J/cm^3)^{1/2}$ or greater, and extremely preferably 8 $(J/cm^3)^{1/2}$ or greater. If the SP values satisfy this range, phase separation can be easily achieved, and the ease of phase separation makes it possible to obtain polycarbonate-based polymer microparticles having a higher content ratio of polycarbonate components. Although there are no specific limitations on the maximum difference between the SP values as long as both the polycarbonate-based polymer (A) and the polymer (B) different from the polycarbonate-based polymer (A) can dissolve in the organic solvent (C), the maximum difference is preferably 20 $(J/cm^3)^{1/2}$ or less, more preferably 15 $(J/cm^3)^{1/2}$ or less, and further preferably 10 $(J/cm^3)^{1/2}$ or less. The SP value referred to herein is a value calculated according to Fedor's estimation method based on the coagulation energy density and the molar molecular volume (hereinafter, also referred to as calculation method) ("SP value, base, application and calculation method", Hideki Yamamoto, published by Johokiko Co., Ltd., Mar. 31, 2005). If the calculation cannot be performed by this method, the SP value is calculated from measurements based on whether it is dissolved in a solvent with a known solubility parameter (hereinafter, also referred to as measurement method), and the calculated value is used instead ("Polymer Handbook Fourth Edition," J. Brand, published by Wiley, 1998).

Appropriate conditions for phase separation can be determined based on a ternary phase diagram made from a simple preliminary test to observe the states when changing the ratio of the three components of the polycarbonate-based polymer (A), the polymer (B) different from the polycarbonate-based polymer (A) and the organic solvent (C) to dissolve them.

To prepare the phase diagram, the polycarbonate-based polymer (A) and the polymer (B) different from the polycarbonate-based polymer (A) are mixed and dissolved at an arbitrary ratio, and left at a stationary condition to determine whether an interface is formed. This test is carried out at least three or more ratios, preferably at five or more ratios, more preferably at 10 or more ratios. By determining the range where two phase separation takes place and the range where only one phase forms, the conditions for desired phase separation can be found.

At that test, whether a phase-separated state is formed or not can be judged by adjusting the ratio of the polycarbonate-based polymer (A), the polymer (B) different from the polycarbonate-based polymer (A) and the organic solvent (C) to a given ratio under the temperature and pressure conditions where the method is to be carried out, then dissolving the polycarbonate-based polymer (A) and the polymer (B) different from the polycarbonate-based polymer (A) completely, stirring the solution thus obtained sufficiently, leaving the stirred solution at a stationary condition for three days, and thereafter observing the resultant solution to determine whether phase separation occurs macroscopically. However, when a sufficiently stable emulsion is formed, there is a case where macroscopic phase separation does not occur even after being left at a stationary condition for three days. In such a case, the occurrence of phase separation is determined based on microscopic phase separation observation carried out by using an optical microscope or phase contrast microscope.

The phase separation takes place as a result of separation between the polycarbonate-based polymer (A) solution phase mainly composed of the polycarbonate-based polymer (A) and the polymer (B) solution phase mainly composed of the polymer (B) different from the polycarbonate-based polymer (A) in the organic solvent (C). The polycarbonate-based polymer (A) solution phase is a phase where mainly the polycarbonate-based polymer (A) is distributed, and the polymer (B) solution phase is a phase where mainly the polymer (B) different from the polycarbonate-based polymer (A) is distributed. The polycarbonate-based polymer (A) solution phase and the polymer (B) solution phase seem to have a volume ratio that depends on the types and amounts of the polycarbonate-based polymer (A) and the polymer (B) different from the polycarbonate-based polymer (A).

From the viewpoint of causing phase separation and ensuring industrial feasibility, each concentration of the polycarbonate-based polymer (A) and the polymer (B) different from the polycarbonate-based polymer (A) in the organic solvent (C) is preferably 1 mass % or more relative to the total mass, more preferably 2 mass % or more, further more preferably 3 mass % or more, and particularly preferably 5 mass % or more, on the precondition that the polymers can actually dissolve in the organic solvent (C). The upper limit is preferably 50 mass %, more preferably 30 mass %, and further preferably 20 mass %.

The interface tension between the two phases of the polycarbonate-based polymer (A) solution phase and the polymer (B) solution phase may be small because both phases are formed of an organic solvent, and this feature allows the resulting emulsion to be maintained stably, which seems to be a major factor causing a narrow diameter distribution.

The interface tension between the two phases is too small to measure directly with the commonly-used hanging drop method in which a solution added to another solution to take measurements. The interface tension, however, can be estimated from the surface tension of each phase exposed to air. Thus, assuming $r_1$ and $r_2$ represent the surface tension of each phase exposed to air, the interface tension $r_{1/2}$ can be estimated as an absolute value of $r_{1/2}=r_1-r_2$.

With respect to a preferred range of $r_{1/2}$, the upper limit is preferably 10 mN/m, more preferably 5 mN/m, further more preferably 3 mN/m, and particularly preferably 2 mN/m. Further, the lower limit is more than 0 mN/m.

The viscosity ratio between the two phases may affect average particle diameter and particle diameter distribution and, the smaller the viscosity ratio is, the narrower the particle diameter distribution tends to be.

With respect to a preferred range of the viscosity ratio between the two phases, the lower limit is preferably 0.1 or more, more preferably 0.2 or more, further preferably 0.3 or more, particularly preferably 0.5 or more, and extremely preferably 0.8 or more. Further, the upper limit is preferably 10 or less, more preferably 5 or less, further preferably 3 or less, particularly preferably 1.5 or less, and extremely preferably 1.2 or less. The viscosity ratio between the two phases referred to herein is defined as a viscosity of the solution phase of the polycarbonate-based polymer (A) divided by a viscosity of the solution phase of the polymer (B) different from the polycarbonate-based polymer (A) at a temperature at which the method is to be carried out.

Using the phase-separation system thus obtained, the liquid phases resulting from phase separation are mixed to form an emulsion and, thereafter, by bringing a poor solvent into contact therewith, polymer microparticles are produced.

To make microparticles, the steps of forming an emulsion and bringing a poor solvent into contact therewith are carried out in a usual reaction vessel. From the viewpoint of the ease of forming an emulsion by an industrial operation, the temperature for forming the emulsion and producing the microparticles may be 0° C. or higher. The upper limit is not particularly restricted as long as it is a temperature at which the polycarbonate-based polymer (A) and the polymer (B) different from the polycarbonate-based polymer (A) can dissolve, phase separation is caused and the desired polymer microparticles can be obtained, however, the lower limit is usually 0° C. or higher, preferably 10° C. or higher, and more preferably 20° C. or higher. Additionally, the upper limit is preferably 300° C. or lower, more preferably 200° C. or lower, further preferably 160° C. or lower, particularly preferably 140° C. or lower, and extremely preferably 100° C. or lower.

From the viewpoint of industrial feasibility, the suitable pressure to carry out the method is from normal pressure to 10 atm. The lower limit is preferably 1 atm. The upper limit is preferably 5 atm, more preferably 3 atm, and further preferably 2 atm.

Further, for the reaction vessel, it is preferred to use an inert gas. Representative examples include nitrogen, helium, argon and carbon dioxide, and preferred are nitrogen and argon.

An emulsion is formed by mixing respective phases together under such a condition. Namely, an emulsion is produced by adding a shear force to the phase-separation solution obtained as described above.

When forming the emulsion, the emulsion is formed such that the solution phase of the polycarbonate-based polymer (A) becomes particle-like liquid drops. Generally, such an emulsion is likely to be formed during phase separation in the case where the volume of the solution phase of the polymer (B) different from the polycarbonate-based polymer (A) is larger than the volume of the solution phase of the polycarbonate-based polymer (A). More specifically, the volume ratio of the solution phase of the polycarbonate-based polymer (A) is preferably less than 0.5 relative to the total volume of both two phases as 1, and also preferably 0.4 to 0.1.

By measuring the volume ratio of each ingredient in correspondence with the concentration thereof at the same time when preparing the above-described phase diagram, it becomes possible to determine an appropriate range of the volume ratio.

The microparticles produced by the production process have a very narrow particle diameter distribution. This is because a highly homogeneous emulsion can be obtained in the steps of forming the emulsion. This tendency is remarkable in the case where a single solvent is used to dissolve both the polycarbonate-based polymer (A) and the polymer (B) different from the polycarbonate-based polymer (A). Therefore, to obtain a sufficient shear force to form an emulsion, a known method of stirring serves the purpose sufficiently, and the mixing can be carried out by the known method such as liquid phase stirring using stirring blades, stirring in a continuous twin mixer, mixing in a homogenizer, ultrasonic irradiation or the like.

More specifically, in the case of stirring using stirring blades, the stirring speed is preferably 50 rpm to 1,200 rpm, more preferably 100 rpm to 1,000 rpm, further preferably 200 rpm to 800 rpm, and particularly preferably 300 to 600 rpm, although it may vary depending upon the shape of the stirring blades.

Representative types of the stirring blades include types of propeller, paddle, flat paddle, turbine, double cone, single cone, single ribbon, double ribbon, screw, and helical ribbon, however, the stirring blades are not particularly limited thereto as long as a shear force can be sufficiently applied to the system. Further, to perform efficient stirring, baffle plates or the like may be provided in the vessel.

Further, to produce an emulsion, it is possible to use not only stirrers, but also any of widely known devices such as emulsifying machine and dispersion machine. Representative devices include batch-type emulsifying machines such as Homogenizer (supplied by IKA Corporation), Polytron (supplied by Kinematica, Inc.), and T. K. Autohomomixer (supplied by Tokushu Kika Kogyo Co., Ltd.), and others such as Ebara Milder (supplied by Ebara Corporation), T. K. Filmics, T. K. Pipeline Homomixer (supplied by Tokushu Kika Kogyo Co., Ltd.), Colloid Mill (supplied by Shinko-Pantec Co., Ltd.), and Slasher, Trigonal Wet Grinder (supplied by Mitsui Miike Kakoki Co., Ltd.), as well as ultrasonic homogenizers and static mixers.

The emulsion thus obtained is subsequently subjected to a step of precipitating microparticles.

To obtain polymer microparticles of the polycarbonate-based polymer (A), a poor solvent for the polycarbonate-based polymer (A) is brought into contact with the emulsion produced by the above-described step to precipitate microparticles having a diameter in correspondence with that of the emulsion.

In particular, one of the key features of the method is that it is not until the contact temperature of the poor solvent for the polycarbonate-based polymer (A) with the emulsion is controlled to 80° C. or higher that it becomes possible to form the microparticles of the polycarbonate-based polymer (A) into a spherical smooth-surfaced shape.

The temperature at the time of bringing the poor solvent into contact may be within a range where the microparticles of the polycarbonate-based polymer (A) can be formed into a spherical smooth-surfaced shape. The contact temperature of the poor solvent is preferably 80° C. or higher, and from the viewpoint of increasing the ratio of spherical particles, more preferably 85° C. or higher, most preferably 90° C. or higher. The upper limit is 300° C. or lower, that is, a temperature at which the polycarbonate-based polymer (A) does not decompose.

The contact between the poor solvent and the emulsion may be achieved by either pouring the emulsion in the poor solvent, or pouring the poor solvent in the emulsion, but it is preferred to pour the poor solvent in the emulsion.

The method of pouring the poor solvent is not particularly restricted as long as it is possible to obtain the polymer microparticles to be produced, and any of continuous dropping method, split dropping method and batch addition method may be employed. However, continuous dropping method and split dropping method are preferably employed because they can prevent coagulation, fusion or coalescence of the emulsion from being caused when adding the poor solvent, which may lead to a large particle diameter distribution or bulky grains larger than 1,000 µm and, to industrially perform it efficiently, the most preferred method is continuous dropping method.

Further, the time to add the poor solvent is within 10 minutes to 50 hours, preferably within 15 minutes to 10 hours, and further preferably 30 minutes to 5 hours.

If it is carried out within a shorter time than these ranges, the emulsion will be likely to undergo coagulation, fusion, or coalescence, which may lead to a large particle diameter distribution or bulky grain. Further, the performance of the addition for a longer time than the above-described ranges is not practical in consideration of industrial performance.

Implementation within these time ranges serves to suppress coagulation among particles when the emulsion is converted to polymer microparticles, and to produce polymer microparticles having a narrow particle diameter distribution.

Although depending upon the state of the emulsion, the amount of the poor solvent to be added is usually from 0.1 to 10 parts by mass. There is a tendency to require an abundance of water to precipitate the polycarbonate-based polymer (A) because the contact temperature of the poor solvent is 80° C. or higher. Thus, the amount of the poor solvent is preferably 1 part by mass or more, more preferably 2 parts by mass or more, and most preferably 3 parts by mass or more.

Although the time of the contact between the poor solvent and the emulsion is not limited as long as the time is sufficient to precipitate microparticles, to cause sufficient precipitation with high productivity, the time is preferably 5 minutes to 50 hours, more preferably 5 minutes to 10 hours, further preferably 10 minutes to 5 hours, particularly preferably 20 minutes to 4 hours, and most preferably 30 minutes to 3 hours, following the completion of the addition of the poor solvent.

Powder of the microparticles can be collected by subjecting the dispersion liquid of polycarbonate-based polymer microparticles thus obtained to a conventional solid-liquid separation method such as filtration, reduced pressure filtration, compression filtration, centrifugal separation, centrifugal filtration, spray drying and the like.

The polymer microparticles obtained from the solid-liquid separation are purified by washing them in a solvent or the like as needed to remove impurities remained on the surface of or within the microparticles.

The method may have an advantage that it is possible to recycle the organic solvent (C) and the polymer (B) different from the polycarbonate-based polymer (A) to again utilize them that are separated in the solid-liquid separation step carried out to produce powder of microparticles.

The solvent resulting from the solid-liquid separation is a mixture of the polymer (B) different from the polycarbonate-based polymer (A), the organic solvent (C) and the poor solvent. By removing the poor solvent from this mixture, the remaining liquid can be recycled as the solvent to form the emulsion. The removal of the poor solvent is carried out by a generally known method such as simple distillation, reduced pressure distillation, precision distillation, thin film distillation, extraction, membrane separation or the like, and preferably simple distillation, reduced pressure distillation or precision distillation is employed.

When distillation operation such as simple distillation or reduced pressure distillation is performed, because heat is applied to the system and there is a possibility that heat decomposition of the polymer (B) different from the polycarbonate-based polymer (A) or the organic solvent (C) is promoted, just as is the case in the production process of polymer microparticles, it is preferably performed in an oxygen-free state, more preferably an inert atmosphere. More specifically, it is preferably preformed under an atmosphere of nitrogen, helium, argon, or carbon dioxide. Further, a phenolic compound may be again added as an antioxidant.

For recycling, it is preferred that the poor solvent is removed as much as possible. More specifically, the amount of the remaining poor solvent is 10 mass % or less, preferably 5 mass % or less, more preferably 3 mass % or less, and particularly preferably 1 mass % or less, relatively to the total amount of the organic solvent (C) and the polymer (B) different from the polycarbonate-based polymer (A) to be recycled. In the cases where the remaining amount of the organic solvent is over this range, the particle diameter distribution of microparticles may become broader or the particles may be coagulated, and thus these cases are not preferred.

The content of the poor solvent in the solvent mixture used for recycle can be measured by a generally known method such as gas chromatography or the Karl Fischer's method.

In practice, there may be a loss of the organic solvent (C) or the polymer (B) different from the polycarbonate-based polymer (A) during the operations of removing the poor solvent. Thus, it is preferred to appropriately adjust the composition ratio to the initial ratio when necessary.

Next, the spherical smooth-surfaced polycarbonate-based polymer microparticles obtained by the production method will be explained in detail.

The smooth-surfaced polycarbonate-based polymer microparticles are characterized in that the microparticles may have an average sphericity of 80 or higher. From the viewpoint of improving the flowability of microparticles and making them suitable for use in cosmetics and films, the average sphericity is preferably 85 or higher, more preferably 90 or higher, further preferably 95 or higher, and most preferably 98 or higher. Further, the upper limit is 100.

The average sphericity is defined as an average of the sphericities of 30 particles selected randomly using scanning electron microscope, and is calculated according to the following equation. The sphericity is defined as a ratio between the shortest diameter and the longest diameter of individual particle, and is calculated according to the following equation:

$$S = \frac{\sum_{i=1}^{n}(D_S/D_L)}{n} \times 100.$$

In the equation, S represents sphericity, n represents the number of measurements (30), $D_S$ represents the shortest diameter of individual particle, and $D_L$ represents the longest diameter of individual particle.

The smooth-surfaced polycarbonate-based polymer microparticles may contain at least 60% microparticles having a sphericity of 80 or higher. From the viewpoint of further improving the flowability of microparticles and making them suitable for use in cosmetics and films, the ratio of the content of microparticles having a sphericity of 80 or higher is preferably 70% or more, more preferably 80% or more, further preferably 85% or more, particularly preferably 90% or more, and most preferably 95% or more. The upper limit is 100%, that is, where all microparticles have a sphericity of 80 or higher.

The ratio of the content of microparticles having a sphericity of 80 or higher is calculated according to the following equation, using the area occupied by microparticles having a sphericity of 80 or higher and the area occupied by polymers having a sphericity of lower than 80 in a 100 μm×100 μm area selected randomly from a photograph taken by scanning electron microscope:

$$P_{80} = \sum_{i=1}^{n_{\geq 80}} S_{\geq 80} / \left( \sum_{i=1}^{n_{\geq 80}} S_{\geq 80} + \sum_{i=1}^{n_{<80}} S_{<80} \right) \times 100.$$

$P_{80}$ represents the ratio of the content of microparticles having a sphericity of 80 or higher, $n_{\geq 80}$ represents the number of microparticles having a sphericity of 80 or higher, $n_{<80}$ represents the number of polymers having a sphericity of lower than 80, $S_{\geq 80}$ represents the area occupied by microparticles having a sphericity of 80 or higher, and $S_{<80}$ represents the area occupied by polymers having a sphericity of lower than 80.

The number average particle diameter of the smooth-surfaced polycarbonate-based polymer microparticles may be generally 100 μm or less, preferably 50 μm or less, more preferably 30 μm or less, particularly preferably 20 μm or less, and most preferably 10 μm or less, although the appropriate range of the particle diameter is determined depending upon the uses such as cosmetics and films.

Because too small microparticles tend to cause particle coagulation when used as toner and the like, the lower limit is 0.1 μm or more, preferably 1 μm or more, more preferably more than 1 μm, further preferably 2 μm or more, particularly preferably 3 μm or more, and most preferably 5 μm or more.

The particle diameter distribution index of the smooth-surfaced polycarbonate-based polymer microparticles that represents the particle diameter distribution may be 3 or less and, in view of improving flowability of microparticles and accordingly making them suitable for various uses such as cosmetics and films, the index is preferably 2 or less, more preferably 1.5 or less, further preferably 1.3 or less, and most preferably 1.2 or less. Further, the lower limit is theoretically 1.

The average particle diameter of the smooth-surfaced polycarbonate-based polymer microparticles referred to herein is defined as a diameter determined by specifying diameters of 100 particles selected randomly from a photograph taken by a scanning electron microscope and calculating the arithmetic average. In the photograph, in case where a particle is not a perfect circle, namely, in such a case where the particle has an ellipse-like shape, the longest diameter of the particle is employed as its particle diameter. To precisely measure the particle diameter, the measurement of the particle diameter is carried out after enlarging the photograph at a magnification of at least 1,000 times or more, preferably 5,000 times or more.

The particle diameter distribution index is calculated from the diameter of each particle measured above according to the following conversion equation:

$$Dn = \sum_{i=1}^{n} Ri/n$$

$$Dv = \sum_{i=1}^{n} Ri^4 / \sum_{i=1}^{n} Ri^3$$

$$PDI = Dv/Dn$$

In the equation, Ri represents diameter of each particle, n represents the number of measurements (100), Dn represents the number average particle diameter, Dv represents the volume average particle diameter, and PDI represents the particle diameter distribution index.

The spherical polycarbonate-based polymer microparticles obtained are smooth-surfaced particles having a good slipperiness and, in addition, are high-functionality microparticles having features of polycarbonates such as high heat resistance, high refractive index and high weather resistance, thus being suitable for use in the following applications: cosmetic materials and additives (such as cosmetic foundations, lipsticks, and scrubbing agents for men's cosmetics), slush-moldable material, rapid prototyping/rapid manufacturing material, paste resin for plastic sol, powder blocking agent, additive for paints, slipperiness improving agent for plastic films/sheets, antiblocking agent, gloss adjusting agent, frosted finish agent, light diffusion agent, surface hardness improving agent, various modifying agents such as ductility improving material, spacer for liquid crystal display equipment, filler for chromatography, medical materials for drug delivery system/diagnostic reagents, support agent for perfume/pesticide, catalyst/carrier for chemical reactions, gas adsorption agent, sintered material for ceramic processing, standard particle material for measurement/analysis, particle material for food manufacture industry, material for powder coating, toner for electrophotographic development, core particle of conductive particle, and particle for pore forming material for metals.

EXAMPLES

Hereinafter, our methods and microparticles will be explained based on Examples, although this disclosure is not particularly limited thereto.
(1) Weight Average Molecular Weight
(i) Determination of Molecular Weight of Polycarbonate
With respect to the weight average molecular weight, using gel permeation chromatography, the molecular weight was calculated based on the calibration curve of polymethyl methacrylate (PMMA).
Equipment: LC-10A series, supplied by Shimadzu Corporation
Column: KF-806L×2, supplied by Showa Denko K.K.
Mobile phase: tetrahydrofuran
Flow rate: 1.0 ml/min.
Detector: differential refractometer
Column temperature: 30° C.
(i) Determination of Molecular Weight of Polymers Different from Polycarbonate
With respect to the weight average molecular weight, using gel permeation chromatography, the molecular weight was calculated based on the calibration curve of polyethylene glycol (PEG).
Equipment: LC-10A series, supplied by Shimadzu Corporation
Column: GF-7 MHQ×2, supplied by Showa Denko K.K.
Mobile phase: 10 mmol/L, lithium bromide aqueous solution Flow rate: 1.0 ml/min.
Detector: differential refractometer
Column temperature: 40° C.

(2) Determination of Glass Transition Temperature of Polycarbonate

By using Robot DSC RD-C220 supplied by Seiko Instruments Inc. under nitrogen atmosphere, the polymer was once heated from 30° C. up to 180° C. at a heating rate of 10° C./min, held there for 1 minute, cooled down to 30° C. at a cooling rate of 10° C./min, held there for 1 minute, and thereafter the glass transition temperature was measured during a heating process up to 180° C. at a heating rate of 10° C./min.

(1) Methods of Measuring Average Particle Diameter and Particle Diameter Distribution The particle diameter of each microparticle was determined from observation made by scanning electron microscopy (with JSM-6301NF scanning electron microscope, supplied by JEOL Ltd.) at a magnification of 1,000 times. The longest diameter of the particle was determined as the particle diameter if the shape of the particle was not a perfect circle.

The average particle diameter was determined by measuring the diameters of 100 randomly selected particles in scanning electron microscope photographs and calculating their arithmetic average.

The particle diameter distribution index, which represents the particle diameter distribution, was calculated from the diameter of each particle measured above according to the following conversion equation:

$$Dn = \sum_{i=1}^{n} Ri/n$$

$$Dv = \sum_{i=1}^{n} Ri^4 \Big/ \sum_{i=1}^{n} Ri^3$$

$$PDI = Dv/Dn.$$

In the equation, Ri represents diameter of each particle, n represents the number of measurements (100), Dn represents the number average particle diameter, Dv represents the volume average particle diameter, and PDI represents the particle diameter distribution index.

The average sphericity is defined as an average of the sphericities of 30 particles that are randomly selected using scanning electron microscope, and is calculated according to the following equation. The sphericity is defined as a ratio between the shortest diameter and longest diameter of individual particle, and is calculated according to the following equation:

$$S = \frac{\sum_{i=1}^{n}(D_S/D_L)}{n} \times 100.$$

In the equation, S represents sphericity, n represents the number of measurements (30), $D_S$ represents the shortest diameter of individual particle, and $D_L$ represents the longest diameter of individual particle.

The ratio of the content of microparticles having a sphericity of 80 or higher is determined by selecting a 100 μm×100 μm area randomly from a photograph taken by scanning electron microscope and thereafter calculating the value from two areas of an area occupied by microparticles having a sphericity of 80 or higher and an area occupied by polymers having a sphericity of less than 80 in the selected area using the following equation:

$$P_{80} = \sum_{i=1}^{n_{\geq 80}} S_{\geq 80} \Big/ \left( \sum_{i=1}^{n_{\geq 80}} S_{\geq 80} + \sum_{i=1}^{n_{<80}} S_{<80} \right) \times 100.$$

$P_{80}$ represents the ratio of the content of microparticles having a sphericity of 80 or higher, $n_{\geq 80}$ represents the number of microparticles having a sphericity of 80 or higher, $n_{<80}$ represents the number of polymers having a sphericity of lower than 80, $S_{\geq 80}$ represents the area occupied by microparticles having a sphericity of 80 or higher, and $S_{<80}$ represents the area occupied by polymers having a sphericity of lower than 80.

Example 1

5.0 g of polycarbonate (supplied by Idemitsu Kosan Co., Ltd., "TARFLON" (registered trademark) A2200, weight average molecular weight: 55,000, glass transition temperature: 150° C.) as polymer (A), 40 g of N-methyl-2-pyrrolidone as the organic solvent (C) and 5.0 g of polyvinyl alcohol (supplied by Nippon Synthetic Chemical Industry Co., Ltd., "Gohsenol" (registered trademark) GL-05, weight average molecular weight: 13,000) as the polymer (B) were added into a 100 mL four-neck flask, heated up to 80° C., and stirred until the polymers were dissolved. With the temperature maintained at 80° C., 100 g of ion exchanged water was dropped as a poor solvent at a speed of 1.64 g/min. through a feeding pump while being stirred at 450 rpm. The obtained suspension was filtered, washing was performed by adding 100 g of ion exchanged water, and the filtrated substances were freeze dried for 10 hours to obtain 4.7 g of white solid material. When the obtained powder were observed by a scanning electron microscope, they were microparticles having smooth-surfaced spherical shape, a number average particle diameter of 8.1 μm, a particle diameter distribution index of 1.10, and an average sphericity of 90. The percentage of microparticles having a sphericity of 80 or higher was 80%. A scanning electron microscopic photograph of the obtained polycarbonate-based polymer microparticles is shown in FIG. 1.

Example 2

Figure 2:
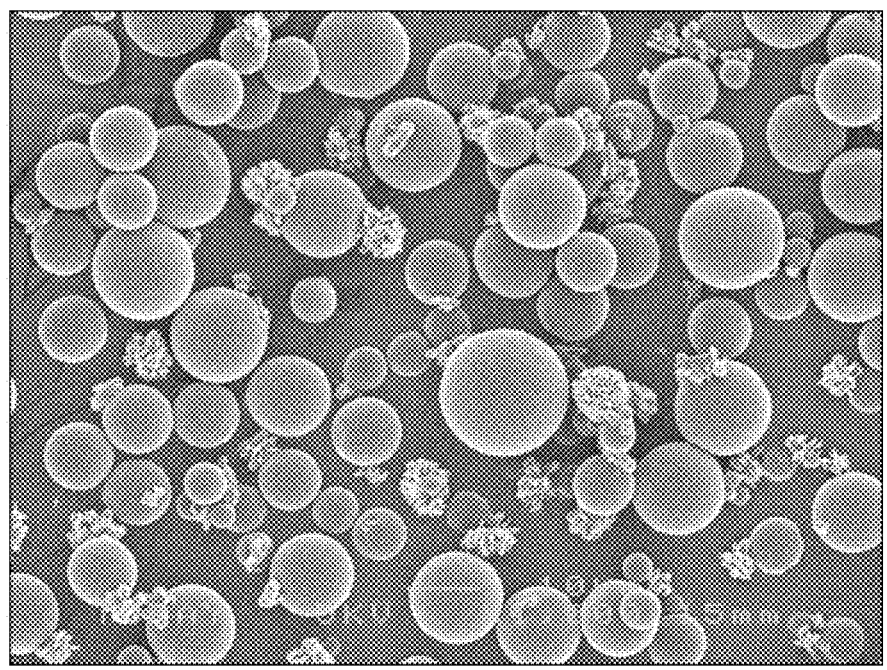
FIG. 2 is an observation diagram where the polycarbonate-based polymer microparticles produced in Example 2 are observed by a scanning electron microscope.

5.0 g of polycarbonate (supplied by Idemitsu Kosan Co., Ltd., "TARFLON" (registered trademark) A2200, weight average molecular weight: 55,000, glass transition temperature: 150° C.) as polymer (A), 40 g of N-methyl-2-pyrrolidone as the organic solvent (C) and 5.0 g of polyvinyl alcohol (supplied by Nippon Synthetic Chemical Industry Co., Ltd., "Gohsenol" (registered trademark) GL-05, weight average molecular weight: 13,000) as the polymer (B) were added into a 100 mL four-neck flask, heated up to 90° C., and stirred until the polymers were dissolved. With the temperature maintained at 90° C., 150 g of ion exchanged water was dropped as a poor solvent at a speed of 2.05 g/min. through a feeding pump while being stirred at 450 rpm. The obtained suspension was filtered, washing was performed by adding 100 g of ion exchanged water, and the filtrated substances were freeze dried for 10 hours to obtain 4.2 g of white solid material. When the obtained powder were observed by a scanning electron microscope, they were microparticles having smooth-surfaced spherical shape, a number average particle diameter of 9.1 µm, a particle diameter distribution index of 1.28, and an average sphericity of 95. The percentage of microparticles having a sphericity of 80 or higher was 88%. A scanning electron microscopic photograph of the obtained polycarbonate-based polymer microparticles is shown in FIG. 2.

Example 3

An experiment was carried out in a manner similar to Example 2 except that 41.5 g of N-methyl-2-pyrrolidone as the organic solvent (C) and 3.5 g of polyvinyl alcohol (supplied by Nippon Synthetic Chemical Industry Co., Ltd., "Gohsenol" (registered trademark) GL-05, weight average molecular weight: 13,000) as the polymer (B) were used, and 4.1 g of white solid material was obtained as a result. The obtained powder had a number average particle diameter of 18.4 µm, a particle diameter distribution index of 1.35, and an average sphericity of 92.

Example 4

An experiment was carried out in a manner similar to Example 2 except that 38.5 g of N-methyl-2-pyrrolidone as the organic solvent (C) and 6.5 g of polyvinyl alcohol (supplied by Nippon Synthetic Chemical Industry Co., Ltd., "Gohsenol" (registered trademark) GL-05, weight average molecular weight: 13,000) as the polymer (B) were used, and 4.1 g of white solid material was obtained as a result. The obtained powder had a number average particle diameter of 5.6 µm, a particle diameter distribution index of 1.20, and an average sphericity of 93.

Comparative Example 1

Figure 3:
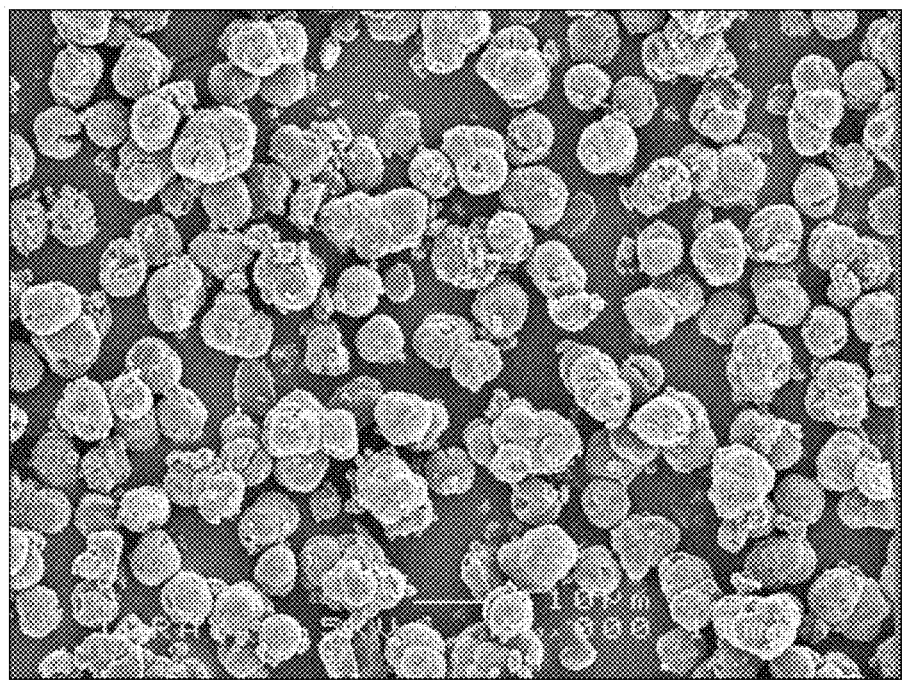
FIG. 3 is an observation diagram where the polycarbonate-based polymer microparticles produced in Comparative Example 1 are observed by a scanning electron microscope.

2.5 g of polycarbonate (supplied by Mitsubishi Engineering-Plastics Corporation, "Iupilon" (registered trademark) E2200, weight average molecular weight: 45,000, glass transition temperature: 150° C.) as polymer (A), 45 g of N-methyl-2-pyrrolidone as the organic solvent (C) and 2.5 g of polyvinyl alcohol (supplied by Nippon Synthetic Chemical Industry Co., Ltd., "Gohsenol" (registered trademark) GL-05, weight average molecular weight: 13,000) as the polymer (B) were added into a 100 mL four-neck flask, heated up to 80° C., and stirred until the polymers were dissolved. After bringing the system temperature back to room temperature, 50 g of ion exchanged water was dropped as a poor solvent at a speed of 0.41 g/min. through a feeding pump while being stirred at 450 rpm. The obtained suspension was filtered, washing was performed by adding 100 g of ion exchanged water, and the filtrated substances were vacuum dried for 10 hours at 80° C. to obtain 2.2 g of white solid material. When the obtained powder were observed by a scanning electron microscope, they were microparticles having porous shape with surface asperities, a number average particle diameter of 9.6 µm, a particle diameter distribution index of 1.12, and an average sphericity of 72. The percentage of microparticles having a sphericity of 80 or higher was 50%. A scanning electron microscopic photograph of the obtained polycarbonate-based polymer microparticles is shown in FIG. 3.

Comparative Example 2

An experiment was carried out in a manner similar to Example 2 except that 50 g of ion exchanged water was dropped as a poor solvent at a speed of 0.41 g/min. through a feeding pump. In the experiment, the microparticles became coagulated with each other during the filtration of the obtained suspension, and therefore the separation by filtration cannot be performed.

Comparative Example 3

The average sphericity of the polycarbonate-based polymer microparticles that were obtained by the method described in Example 1 of Reference Literature 4 (JP-A-2001-213970) was calculated to be 48 according to the scanning electron microscopic photograph of FIG. 3. The calculated percentage of microparticles having a sphericity of 80 or higher was 43%.

TABLE 1

| | Shape of particles | Average sphericity | Ratio of particles having a sphericity of 80 or more (%) | Number average particle diameter (µm) | Particle diameter distribution index |
|---|---|---|---|---|---|
| Example 1 | spherical | 90 | 80 | 8.1 | 1.10 |
| Example 2 | spherical | 95 | 88 | 9.1 | 1.28 |
| Comparative Example 1 | porous | 72 | 52 | 9.6 | 1.12 |
| Comparative Example 3 | spherical | 48 | 43 | — | — |

INDUSTRIAL APPLICABILITY

The spherical polycarbonate-based polymer microparticles obtained are smooth-surfaced particles having a good slipperiness and, in addition, are high-functionality microparticles having features of polycarbonates such as high heat resistance, high refractive index and high weather resistance, thus being suitable for use in the following applications: cosmetic materials and additives (such as cosmetic foundations, lipsticks, and scrubbing agents for men's cosmetics), slush-moldable material, rapid prototyping/rapid manufacturing material, paste resin for plastic sol, powder blocking agent, additive for paints, slipperiness improving agent for plastic films/sheets, antiblocking agent, gloss adjusting agent, frosted finish agent, light diffusion agent, surface hardness improving agent, various modifying agents such as ductility improving material, spacer for liquid crystal display equipment, filler for chromatography, medical materials for drug delivery system/diagnostic reagents, support agent for perfume/pesticide, catalyst/carrier for chemical reactions, gas adsorption agent, sintered material for ceramic processing, standard particle material for measurement/analysis, particle material for food manufacture industry, material for powder coating, toner for electrophotographic development, core particle of conductive particle, and particle for pore forming material for metals.

The invention claimed is:
1. A method of producing polycarbonate-based polymer microparticles comprising:

forming an emulsion in a system in which a polycarbonate-based polymer (A), a polymer (B) different from said polycarbonate-based polymer (A) and an organic solvent (C) are dissolved and mixed together and which causes phase separation into two phases of a solution phase having said polycarbonate-based polymer (A) as its main component and a solution phase having said polymer (B) different from said polycarbonate-based polymer (A) as its main component, and contacting a poor solvent for said polycarbonate-based polymer (A) with said emulsion at a temperature of 80° C. or higher to thereby precipitate microparticles of said polycarbonate-based polymer (A).

2. The method according to claim 1, wherein a contact temperature of said poor solvent for said polycarbonate-based polymer (A) with said emulsion is 90° C. or higher.

3. The method according to claim 2, wherein said poor solvent for said polycarbonate-based polymer (A) is contacted with said emulsion at a ratio of 1 to 10 parts by mass to a total amount of said emulsion of 1 part by mass.

4. The method according to claim 2, wherein said poor solvent for said polycarbonate-based polymer (A) is any of water, methanol and ethanol.

5. The method according to claim 2, wherein said polymer (B) is any of polyvinyl alcohol, hydroxypropyl cellulose, polyethylene oxide and polyethylene glycol.

6. The method according to claim 1, wherein said poor solvent for said polycarbonate-based polymer (A) is contacted with said emulsion at a ratio of 1 to 10 parts by mass to a total amount of said emulsion of 1 part by mass.

7. The method according to claim 6, wherein said poor solvent for said polycarbonate-based polymer (A) is any of water, methanol and ethanol.

8. The method according to claim 7, wherein said polymer (B) is any of polyvinyl alcohol, hydroxypropyl cellulose, polyethylene oxide and polyethylene glycol.

9. The method according to claim 1, wherein said poor solvent for said polycarbonate-based polymer (A) is any of water, methanol and ethanol.

10. The method according to claim 9, wherein said polymer (B) is any of polyvinyl alcohol, hydroxypropyl cellulose, polyethylene oxide and polyethylene glycol.

11. The method according to claim 1, wherein said polymer (B) is any of polyvinyl alcohol, hydroxypropyl cellulose, polyethylene oxide and polyethylene glycol.

12. The method according to claim 1, wherein said organic solvent (C) is an aprotic polar solvent.

13. The method according to claim 12, wherein said aprotic polar solvent is any of N-methyl-2-pyrrolidone, dimethyl sulfoxide, N,N-dimethyl formamide, N,N-dimethyl acetamide and propylene carbonate.

* * * * *